(12) United States Patent
Hixson (10) Patent No.: US 11,350,567 B2
(45) Date of Patent: Jun. 7, 2022

(54) LAWN MOWER MOUNTED STRING TRIMMER ATTACHMENT APPARATUS AND METHOD

(71) Applicant: Frederick Kent Hixson, Helena, MT (US)

(72) Inventor: Frederick Kent Hixson, Helena, MT (US)

( * ) Notice: Subject to any disclaimer, the term of this patent is extended or adjusted under 35 U.S.C. 154(b) by 670 days.

(21) Appl. No.: 16/397,522

(22) Filed: Apr. 29, 2019

(65) Prior Publication Data

US 2020/0337229 A1    Oct. 29, 2020

(51) Int. Cl.
| | |
|---|---|
| *A01D 34/66* | (2006.01) |
| *A01D 34/78* | (2006.01) |
| *A01D 34/67* | (2006.01) |
| *A01D 34/416* | (2006.01) |
| *A01D 101/00* | (2006.01) |

(52) U.S. Cl.
CPC ....... *A01D 34/4165* (2013.01); *A01D 34/661* (2013.01); *A01D 34/67* (2013.01); *A01D 34/78* (2013.01); *A01D 2101/00* (2013.01)

(58) Field of Classification Search
CPC .. A01D 34/4165; A01D 34/661; A01D 34/67; A01D 34/78; A01D 2101/00
See application file for complete search history.

(56) References Cited

U.S. PATENT DOCUMENTS

| | | | |
|---|---|---|---|
| 5,966,914 A | 10/1999 | Reents | |
| 6,779,325 B1* | 8/2004 | Robillard, II | A01D 34/82 |
| | | | 56/12.7 |
| 7,165,383 B1 | 1/2007 | Luton | |
| 7,975,459 B1* | 7/2011 | Murawski | A01D 43/16 |
| | | | 56/13.6 |
| 8,464,504 B1 | 6/2013 | Huff | |
| 9,386,740 B2 | 7/2016 | Miller | |
| 9,510,506 B2* | 12/2016 | Castelli | A01D 34/4165 |
| 9,560,803 B2* | 2/2017 | Kobayashi | A01D 43/16 |
| 2003/0230065 A1* | 12/2003 | Hennum | A01D 43/16 |
| | | | 56/11.9 |
| 2004/0237491 A1* | 12/2004 | Heighton | A01D 34/416 |
| | | | 56/12.7 |
| 2014/0338299 A1* | 11/2014 | Lowery | A01D 34/4165 |
| | | | 56/12.7 |
| 2015/0040529 A1* | 2/2015 | Standridge | A01D 34/416 |
| | | | 56/13.7 |

(Continued)

*Primary Examiner* — Abigail A Risic
(74) *Attorney, Agent, or Firm* — Shlesinger, Arkwright & Garvey, LLP (57) ABSTRACT

A string trimmer attachment apparatus and method for easy attachment to a lawn mower deck, without requiring the use of tools for attachment, by having an adjustable trimmer mounting platform which securely attaches to the lawn mower. A string-type powered trimmer motor on the bottom side of the adjustable trimmer mounting platform cuts the grass. An operating control located on the lawn mower controls the string-type powered trimmer motor. A pair of L brackets allow the adjustable trimmer mounting platform to firmly attach to the lawn mower without the need for a separate trimmer/edger appliance. No tools or lawn mower modifications are required to attach the adjustable trimmer mounting platform to the mower deck.

20 Claims, 6 Drawing Sheets

(56) References Cited

U.S. PATENT DOCUMENTS

| | | | | |
|---|---|---|---|---|
| 2015/0052867 A1* | 2/2015 | Castelli | ............... | A01D 34/84 56/229 |
| 2015/0107118 A1* | 4/2015 | Banjo | ............... | A01D 34/4166 29/401.1 |
| 2015/0208575 A1* | 7/2015 | Miller | ............... | A01D 34/001 56/12.7 |

* cited by examiner

LAWN MOWER MOUNTED STRING TRIMMER ATTACHMENT APPARATUS AND METHOD

FIELD OF THE INVENTION

This application relates to a string trimmer attachment apparatus and method for attachment to a lawn mower, useful for trimming and edging lawn grass. The lawn mower mounted string trimmer apparatus is particularly adapted for easy attachment to a lawn mower deck, either to a push lawn mower or a riding lawn mower, without the use of tools.

BACKGROUND OF THE INVENTION

Separate string grass trimming tools are historically well known. There has been a recognized need, particularly by those maintaining the traditional English grass yard, for a grass trimmer that attaches easily to the edge of walk behind (or push) and riding mowers. A string trimmer that requires no tools or mower modifications to conveniently attach a platform containing such a trimmer to a mower deck particularly in demand, preferably one mad of a lightweight material.

There has been a recognized need for providing such a trimming tool in a manner to make grass trimming and edging easier, faster and more convenient. There is no known technology being used to solve the problem of allowing a separate string grass trimmer to be easily and quickly attached to a lawn mower without the use of tools and some complicated assembly.

The trimmer attachment devices described in the related art do not disclose all the features of the present invention and would not be as suitable for the required purpose as set for the manner of the present invention hereinafter described. String trimmer attachment devices are known in the related art, such as U.S. Pat. No. 9,510,506 to Castelli et al. ("Castelli") and U.S. Pat. No. 9,386,740 to Miller ("Miller") None of these patents disclose the attachment bracket as disclosed in the present invention. U.S. Pat. No. 9,510,506 to Castelli et al. ("Castelli") discloses a battery powered strong trimmer having multi-pieced adjustable, single bracket for mounting to the side of a trimmer to a push lawn mower. The bracket is secured to the side of the mower by a series of bolts and includes screw type adjustment means and the trimmer is pivotable. Castelli, however, does not disclose providing a pair of brackets as in the present invention, using clamps in place of bolts. Castelli's disclosure teach away from the disclosures of the present invention. Nor does Castelli disclose a mower deck as an element as in the present invention. Miller discloses a battery powered string trimmer with an integral mounting bracket and retraction feature, and is adapted for mounting on a conventional push mower. Miller discloses a pivoting arm that supports the trimmer, adjustably pivoted by a cylinder, both of which are bolted to the mower deck. None of the references cited disclose the clamping arrangement of the present invention.

None of the references teach or suggest the combination of a support platform having two clamping means to secure the platform to the side of mower deck, including a trimming unit that is secured to the deck. The use of two clamps provides a more stable connection for the platform to the side of the mower deck and support the power source, such as a battery. There is no suggestion for providing two clamps in Castelli or adding a platform to Castelli because doing so would undermine how Castelli functions. The mechanism and elements of the present invention are not found in the related art. Castelli and Miller provide specific approaches to adapt various components, teaching away from the elements and mechanism of the present invention.

None of the references contain every feature of the present invention, and none of these references in combination disclose, suggest or teach every feature of the present invention.

The foregoing and other objectives, advantages, aspects, and features of the present invention will be more fully understood and appreciated by those skilled in the art upon consideration of the detailed description of a preferred embodiment, presented below in conjunction with the accompanying drawings.

SUMMARY OF THE INVENTION

The present invention is a string trimmer attachment apparatus and method for attachment to a lawn mower, useful for trimming and edging lawn grass. The lawn mower mounted string trimmer apparatus is particularly adapted for easy attachment to a lawn mower deck, either to a push lawn mower or a riding lawn mower, without requiring the use of tools for attachment.

The lawn mower mounted trimmer attachment apparatus and method has an adjustable trimmer mounting platform comprising: a top side and an opposing bottom side, a mower side and an opposing trimmer side attaching to a lawn mower. The lawn mower may be one of any number of push mowers or riding lawn mowers for doing the grass trimming and edging, detail work required to complete the lawn mowing job.

The adjustable trimmer mounting platform further comprises a pair of tightening and clamping means and a string-type powered trimmer motor located on the top side. The pair of tightening and clamping means cooperatively and securely attach the adjustable trimmer mounting platform to the lawn mower. In one embodiment of the present invention, the pair of tightening and clamping means are two adjustable hooking pressure clamps. The string-type powered trimmer motor vertically penetrates the adjustable trimmer mounting platform to allow for a trimmer line extending from and operating by the string-type powered trimmer motor on the opposing bottom side, exposed thereby to allow for cutting the grass. The string-type powered trimmer motor comprises a trimmer motor power source operatively connecting to the string-type powered trimmer motor by a power line. At least one operating control (on/off switch) controls the string-type powered trimmer motor by an operating line handily located on the lawn mower.

The lawn mower is located opposite and proximal to the mower side of the adjustable trimmer mounting platform and comprises a mower deck having a vertically descending perimeter dock skirt, a deck outside and an opposing deck inside.

The pair of tightening and clamping means rigidly and conformably attaches and removably secures the adjustable trimmer mounting platform to the deck skirt of the mower deck. A pair of L brackets attach to the opposing bottom side at the mower side, and snugly fit against and enclose the deck skirt against the pair of tightening and clamping means, so that the adjustable trimmer mounting platform firmly, operatively and cooperatively attaches to the lawn mower allowing the user to trim and edge a lawn without the need for a separate trimmer/edger appliance to complete the detail work required for cutting a grass lawn.

In one embodiment of the present invention, the pair of tightening and clamping means are two adjustable hooking pressure clamps, each comprising a sliding cylinder, pivotally attached to a the pair of clamp locking pivot arms at a clamp locking end toward the opposing trimmer side and extending from the clamp locking end laterally to an clamping lock position toward the mower side. The sliding cylinder is attached to an adjustable threaded bolt at the clamping lock position, having a locking nut which threadingly terminates the sliding cylinder at the clamping lock position. A cylinder sleeve freely encloses and supports the sliding cylinder between the clamp locking end and the locking nut. The sliding cylinder slidingly and freely moves laterally within the cylinder sleeve between the clamping locking end and the clamping lock position at the locking nut. By this arrangement, the pair of clamp locking pivot arms pivotally and cooperatively pushes and pulls the sliding cylinder laterally when the clamp handle is rotated in a locking motion, causing the sliding cylinder to move laterally through the cylinder sleeve and the flexible cylinder end cap to securely press against and adhere or attach to deck skirt of the deck outside while simultaneously causing the respective pair of 1 brackets to securely tighten against the opposing deck inside, and the lawn mower mounted trimmer attachment apparatus to securely attach to the mower deck.

In an alternative embodiment, the lawn mower mounted trimmer attachment apparatus, the pair of tightening and clamping means each comprises a quick release/locking pressure clamp.

An advantage of the present invention is that it requires no tools or lawn mower modifications to attach the adjustable trimmer mounting platform to the mower deck, allowing the present invention to be user friendly and easily managed.

Another advantage of the present invention is that the adjustable trimmer mounting platform and the trimmer line are level with the mower deck, allowing the trimmer line to cut lawn grass level with the mower deck in approximately acceptable length swaths around the perimeter of the lawn area to be mowed, kicking grass clippings under the lawn mower to be bagged, mulched, or discharged. Keeping the trimmer line level with the mower deck enables the push lawn mower and the riding lawn mower to keep trimmed lawn area of grass level and even at all times.

The adjustable trimmer mounting platform, in embodiments of the present invention only protrudes past the plurality of wheels and does not impair maneuverability or storage of the push lawn mower or the riding lawn mower. The adjustable trimmer mounting platform is easily and quickly attached or removed, in less than 1 to 2 minutes. This allows for trimmer line replacement and storage.

Another advantage of the present invention is that the pair of L brackets are molded flush with the opposing bottom side of the adjustable trimmer mounting platform, protruding past the back edge of the adjustable trimmer mounting platform then upward, approximately 90 degrees to allow the pair of L brackets to slide behind the inside of mower deck.

The aforementioned features, objectives, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objects of the present invention will become apparent in the following detailed descriptions, taken in conjunction with the accompanying drawings. However, the drawings are provided for purposes of illustration only, and are not intended as a definition of the limits of the invention.

DETAILED DESCRIPTION OF THE INVENTION

The present invention will now be described more fully hereinafter with references to the accompanying drawings, in which the preferred embodiment of the invention is shown. This invention, however, may be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Turning now in detail to the drawings in accordance with the present invention, one embodiment of the present invention is depicted in FIGS. 1-5, a lawn mower mounted trimmer attachment apparatus 100, comprising an adjustable trimmer mounting platform 101 comprising: a top side 102 and an opposing bottom side 103, a mower side 104 and an opposing trimmer side 105 attaching to a lawn mower 120. The lawn mower 120 may be one of any number of push mowers 127 pushed by a user 124, or riding lawn mowers 128 ridden by the user 124 (shown in FIGS. 1 and 6) commonly known in the lawn mowing industry and used by the user 124 for doing the grass trimming and edging, detail work required to complete the lawn mowing job.

The adjustable trimmer mounting platform 101, depicted in FIGS. 1-6, further comprises a pair of tightening and clamping means 130 located, respectively, on a left side 10g and an opposing right side 109 of the top side 102 of the adjustable trimmer mounting platform 101, a string-type powered trimmer motor 107 located on the top side 102 centrally between the left side 108 and the opposing right side 109 and proximal to the opposing trimmer side 105. The pair of tightening and clamping means 130 are means for rigidly, conformably, cleanly and cooperatively, and securely attaching the adjustable trimmer mounting platform 101 to a vertically descending perimeter deck skirt 119 of the lawn mower 120, the terms cleanly and cooperatively hereby describing that the present invention allows attachment of the adjustable trimmer mounting platform 101 to a mower deck 121 without modification to the adjustable trimmer mounting platform 101 or the lawn mower 120.

In one embodiment of the present invention, the pair of tightening and clamping means 130 are two adjustable hooking pressure clamps 144. The string-type powered trimmer motor 107 vertically penetrates the adjustable trimmer mounting platform 101 to allow for a trimmer line 113 having an opposing free end 115 and an attached end 114 extending from and operating by the string-type powered trimmer motor 107 on the opposing bottom side 103, exposed thereby to allow for cutting the grass, as is understood in this industry. The string-type powered trimmer motor 107 comprises a trimmer motor power source 112 operatively connecting to the string-type powered trimmer motor 107 by a power line 148. The string-type powered trimmer motor 107 may be one of any number of any number of sing-type powered trimmer motors 107 commonly known and used in the lawn mowing industry as for hand held trimmer/edger lawn appliances. The trimmer motor power source 112 may be a battery, a remote electric source or a gasoline engine. At least one operating control 111 (on/off switch), as commonly used in the industry to operate string-type powered trimmer motors, attaching to and controlling the string-type powered trimmer motor 107 by an operating line 149 and are handily located on the lawn mower 120 for the user 124.

The lawn mower 120 in one embodiment of the present invention, as shown in FIGS. 1-3 and 6, is located opposite and proximal to the mower side 104 of the adjustable trimmer mounting platform 101, and comprises the mower deck 121 having the vertically descending perimeter deck skirt 119, a deck outside 122 and an opposing deck inside 123. The adjustable trimmer mounting platform 101 is level with the mower deck 121. A lawn mower motor 125 is centrally located on the mower deck 121, having a lawn mower power source 129 operatively connecting to the lawn mower motor 125 by a power line 148, and a mower blade 106 which is centrally located on the opposing deck inside 123 beneath and propelled by the lawn mower motor 125, and a plurality of wheels 126 perimeterively (i.e., on the perimeter) and cooperatively located on and attached to the deck outside 122 of the vertically descending perimeter deck skirt 119. The present invention is constructed of durable materials commonly used in this industry, typically a combination of metal and hard plastic parts. The lawn mower motor power source 129 may be a battery, a remote electric source or a gasoline engine, commonly used in the lawn mower industry.

Figure 2:
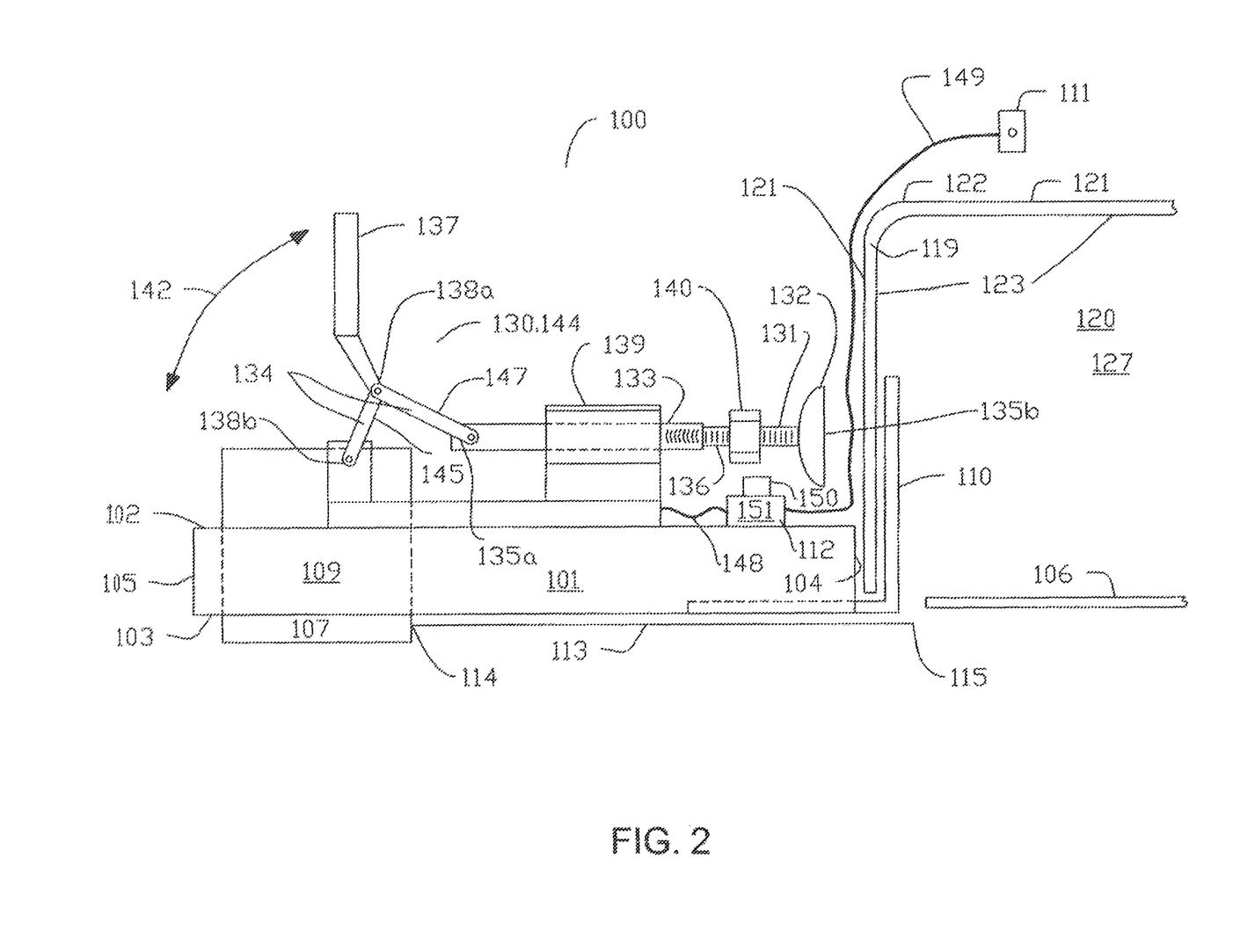
FIG. 2 illustrates a partial, opposing right side elevational view of one embodiment of the present invention, depicting elements of the invention located on an adjustable trimmer mounting platform.
Figure 4:
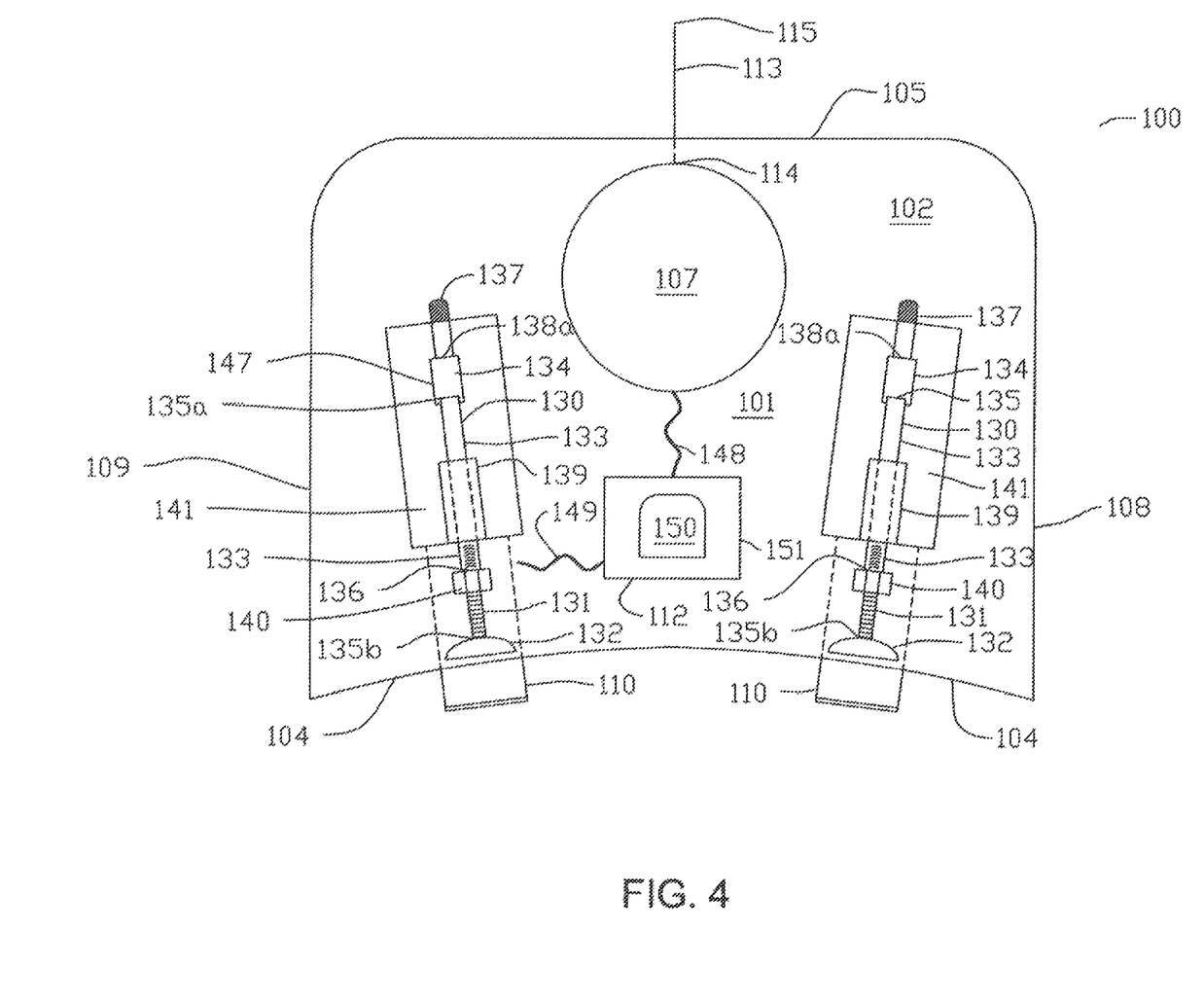
FIG. 4 illustrates a partial, top planar view of one embodiment of the present invention, depicting elements of the invention located on or with the adjustable trimmer mounting platform.
Figure 5:
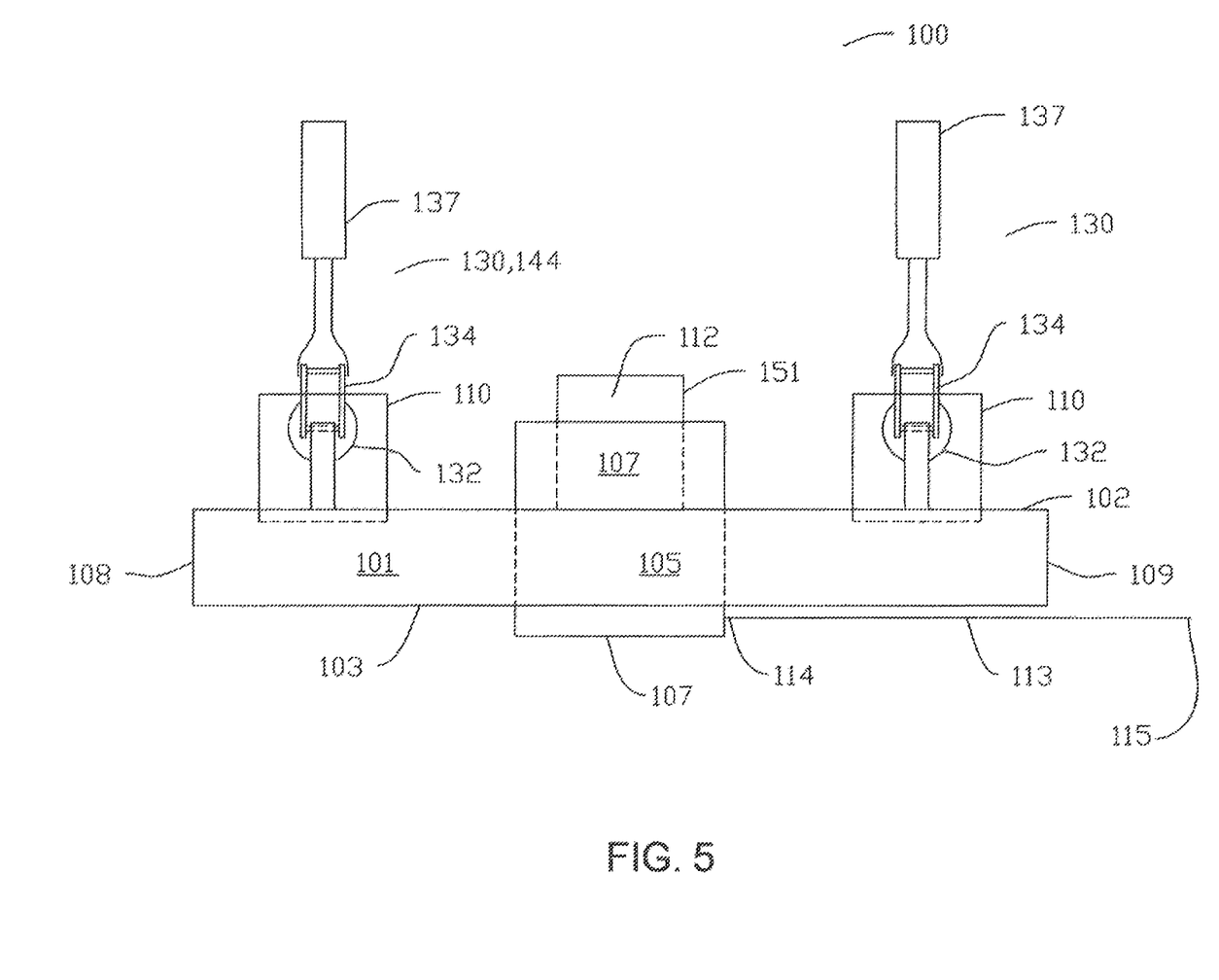
FIG. 5 illustrates a partial, opposing trimmer side elevational view of one embodiment of the present invention, depicting elements of the invention located on or with the adjustable trimmer mounting platform.

In this embodiment of the present invention, the pair of tightening and clamping means 130, shown in detail in FIGS. 2, 4 and 5, rigidly and conformably attaches and removably secures the adjustable trimmer mounting platform 101 to the vertically descending perimeter deck skirt 119 of the mower deck 121. A pair of L brackets 110 attach to the opposing bottom side 103 at the mower side 104, and snugly fit against and enclose the vertically descending perimeter deck skirt 119 against the pair of tightening and clamping means 130. In this manner, the adjustable trimmer mounting platform 101 of the lawn mower mounted trimmer attachment apparatus 100 firmly, operatively and cooperatively attaches to the lawn mower 120 allowing the user 124 to trim and edge a lawn without the need for a separate trimmer/edger appliance to complete the detail work required for cutting a grass lawn.

In one embodiment of the present invention, the pair of tightening and clamping means 130, shown in detail in FIGS. 2, 4 and 5, are two adjustable hooking pressure clamps 144, each comprising a sliding cylinder 133, pivotally attached to a the pair of clamp locking pivot arms 134 at a clamp locking end 135a toward the opposing trimmer side 105 and extending from the clamp locking end 135a laterally to an clamping lock position 136 toward the mower side 104. The pair of clamp locking pivot arms 134 each comprise an opposing anchor arm end 138b and a sliding arm 147. The sliding cylinder 133 is attached to an adjustable threaded bolt 131 at the clamping lock position 136, the adjustable threaded bolt 131 having a locking nut 140 cooperatively threaded on the adjustable threaded bolt 131. The locking nut 140 threadingly terminates the sliding cylinder 133 at the clamping lock position 136. The adjustable threaded bolt 131 terminates at an opposing cap end 135b proximal to the mower side 104 of the adjustable trimmer mounting platform 101. In another embodiment of the present invention, the pair of tightening and clamping means 130, shown in FIG. 1, the pair of tightening and clamping 130 means each comprising: a quick release/locking pressure clamp 143.

In this embodiment of the present invention, the two adjustable hooking pressure clamps 144 (shown in FIGS. 2 and 5) each further comprise a flexible clamp end 132, or end cap, at the opposing cap end 135b. The flexible end clamp 132 is made of flexible material, commonly rubber as well known in the industry, which when applied to a surface adheres in a suction manner. The sliding arm 147 to the pair of clamp locking pivot arms 134 attaches to and pivotally engages the sliding cylinder 133 at the clamp locking end 35a and concurrently and cooperatively attaches to a clamp handle 137 at a handle end 138a. The opposing anchor arm end 138b to the pair of clamp locking pivot arms 134 pivotally attaches and anchors to the adjustable trimmer mounting platform 101 at an anchoring arm 145 and to the sliding arm 147 and the clamp handle 137 at the handle end 138a. A cylinder sleeve 139 freely encloses and supports the sliding cylinder 133 between the clamp locking end 135a and the locking nut 140, and is stationarily affixed to a clamping base 141 attached to the top side 102. The sliding cylinder 133 slidingly and freely moves laterally within the cylinder sleeve 139 between the clamping locking end 135a and the clamping lock position 136 at the locking nut 140. By this arrangement, the pair of clamp locking pivot arms 134 pivotally and cooperatively pushes and pulls the sliding cylinder 139 laterally when the user 124 rotates the clamp handle 137 in a locking motion 142. The locking motion 142 is a vertical (up and down) movement of the clamp handle 137 as shown in FIG. 2.

When the user 124 rotates the clamp handle 137 in the locking motion 142 (shown in FIG. 2) the sliding cylinder 133 moves laterally through the cylinder sleeve 139, causing the flexible cylinder end cap 132 to securely press against and adhere or attach to vertically descending perimeter deck skirt 119 of the deck outside 122 while simultaneously causing the respective pair of L brackets 110 to securely tighten against the opposing deck inside 123, causing the lawn mower mounted trimmer attachment apparatus 100 to securely attach to the mower deck 121. This action by the user 124 may be visualized and anticipated by the depiction of the device in FIGS. 2-4, resulting in the installation of the lawn mower mounted trimmer attachment apparatus 100 to the push lawn mower 127 shown in FIG. 1, or the riding lawn mower 129 shown in FIG. 6.

Figure 1:
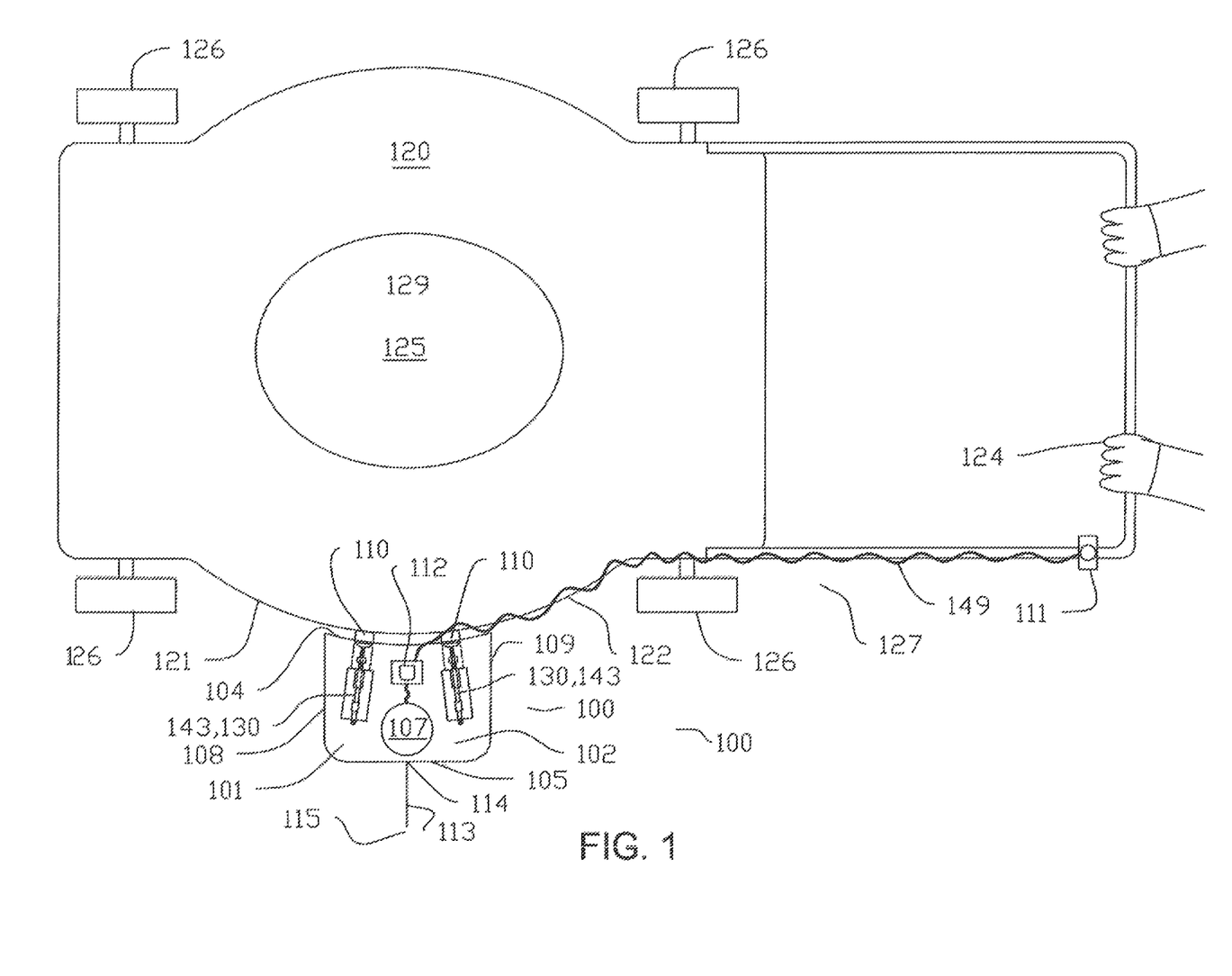
FIG. 1 illustrates a top planar view of one embodiment of the present invention, depicting elements of the lawn mower mounted trimmer attachment apparatus and method, a user having a push lawn mower.

In an alternative embodiment of the present invention, the lawn mower mounted trimmer attachment apparatus 100, shown in FIG. 1, the pair of tightening and clamping 130 means each comprises a quick release/locking pressure clamp 143.

In one embodiment of the present invention, depicted in FIGS. 1-6, the lawn mower mounted trimmer attachment apparatus 100 has a molded plastic platform constituting the adjustable trimmer mounting platform 101, with a battery powered adjustable grass trimmer for the sting-type powered trimmer motor 107 and the trimmer motor power source 112. As noted above, the lawn mower mounted trimmer attachment apparatus 100 attaches easily to the edge or deck outside 122 of the mower deck 121 of push lawn mower 127, or walk behind mower, and riding lawn mower 128. Commonly a user 124 may have both types of lawn mowers and can easily transfer the lawn mower mounted trimmer attachment apparatus 100 to either type of lawn mower.

In an alternative embodiment of the present invention, a lawn mower mounted trimmer method comprises having an adjustable trimmer mounting platform 101 having a top side 102 and an opposing bottom side 103, a mower side 104 and an opposing trimmer side 105, and a pair of tightening and clamping means 130 located, respectively, on a left side 108 and an opposing right side 109 of the top side 102, as depicted in FIGS. 1-5. The method locates a string-type powered trimmer motor 107 on the top side 102 centrally between the left side 108 and the opposing right side 109 and proximal to the opposing trimmer side 105, having the string-type powered trimmer motor 107 vertically penetrate the adjustable trimmer mounting platform 101. A lawn mower 120 is located opposite and proximal to the mower side 104 and comprising: a mower deck 121 having a vertically descending perimeter deck skirt 119, a deck outside 122 and an opposing deck inside 123, a lawn mower motor 125 centrally located on the mower deck 121, a lawn mower power source 129 operatively connecting to the lawn mower motor 125 by a power line 148, a mower blade 106 centrally located on the opposing deck inside 123 beneath and propelled by the lawn mower motor 125, and a plurality of wheels 126 perimeterively and cooperatively located on and attached to the vertically descending perimeter deck skirt 119.

Figure 3:
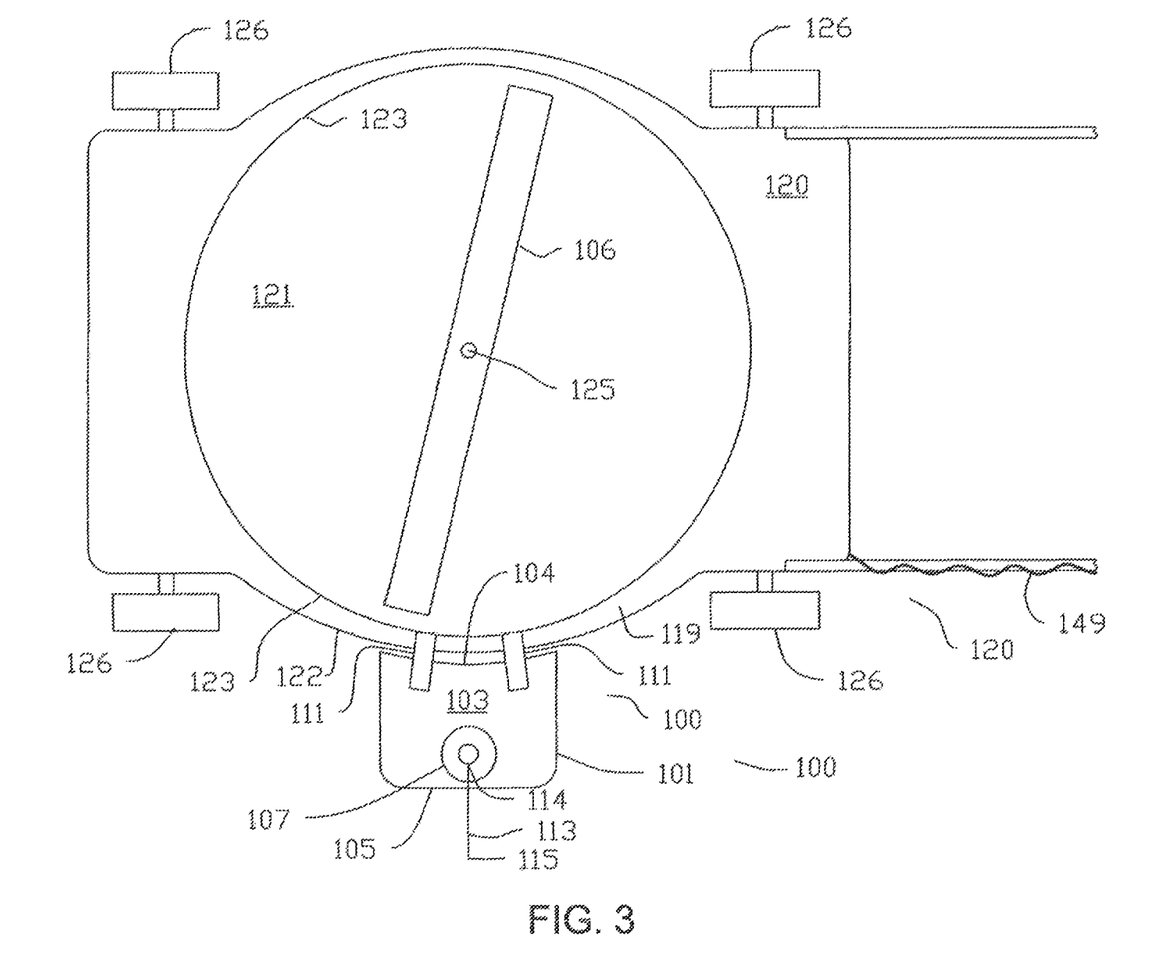
FIG. 3 illustrates a bottom planar, partial view of one embodiment of the present invention, depicting the lawn mower mounted trimmer attachment apparatus and method having the push mower.

In this embodiment of the present invention, shown in FIGS. 2 and 3, the method provides the pair of tightening and clamping means 130 rigidly and conformably attaching and removably securing the adjustable trimmer mounting platform 101 to the vertically descending perimeter deck skirt 119 of the mower deck 121. The method has the string-type powered trimmer motor 107, depicted in FIGS. 1-6, comprising a trimmer motor power source 112 operatively connecting to the string-type powered trimmer motor 107, a trimmer line 113 having an opposing free end 115 and an attached end 114 extending from and operating by the string-type powered trimmer motor 107 on the opposing bottom side 103; and an at least one operating control 111 (on/off switch) attaching to and controlling the string-type powered trimmer motor 107 by an operating line 149 and being handily located on the lawn mower 120 for a user 124.

In an alternative embodiment of the present invention, depicted in FIGS. 2 and 3, the method provides a pair L brackets 110 attached to the opposing bottom side 103 at the mower side 104, and snugly fitting and enclosing the vertically descending perimeter deck skirt 119 against the pair of tightening and clamping means 130, each of which comprises a quick release/locking pressure clamp 143 (see FIG. 1). The lawn mower mounted trimmer attachment apparatus 100 is operatively, firmly and cooperatively attached to the lawn mower 120.

Figure 6:
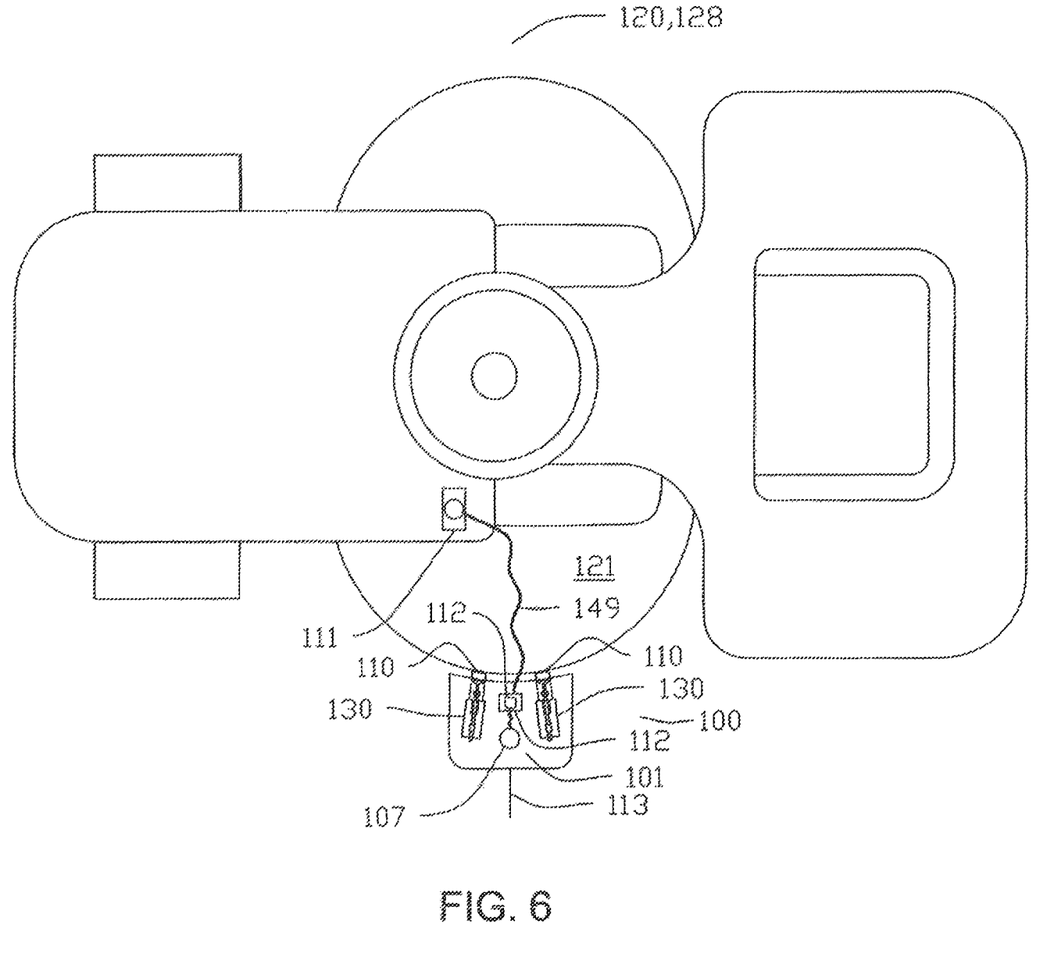
FIG. 6 illustrates a top planar view of one embodiment of the present invention, depicting elements of the lawn mower mounted trimmer attachment apparatus, having a riding lawn mower.

In an alternative embodiment of the present invention, the method includes a push lawn mower 127 pushed by a user 124 or a riding lawn mower 128 ridden by the user 124, as shown in FIGS. 1 and 6. The trimmer motor power source 112 is one of: a battery, a remote electric source or a gasoline engine. The lawn mower motor power source 129 is one of: a battery, a remote electric source or a gasoline engine.

In an alternative embodiment of the present invention, the method provides the pair of L brackets 110 in FIG. 2 being flushly and conformably molded with the opposing bottom side 103 of the adjustable trimmer mounting platform 101, and protruding past the mower side 104 of the adjustable trimmer mounting platform 101 then upward, allowing the pair of L brackets 110 to slide against the opposing deck inside 123 opposite the mower side 104.

In an alternative embodiment of the present invention, the method includes the pair of L brackets 110 being made of rigid metal.

In an alternative embodiment of the present invention, the method includes the adjustable trimmer mounting platform 101 shown in FIGS. 1-6 made of molded plastic.

In an alternative embodiment of the present invention, depicted in FIGS. 1-6, the method requires no tools or lawn mower modifications to attach the adjustable trimmer mounting platform 101 to the mower deck 121 of the lawn mower 120, shown in FIGS. 1, 3 and 6. The adjustable trimmer mounting platform 101 is attached to the mower deck 121 in the present invention with the pair of L brackets 110, allowing the present invention to be user 124 friendly, easily managed. The pair of tightening and clamping 130 means in an alternative embodiment each comprise a quick release/locking pressure clamp 143, allowing for a flip of the pair of clamp handles 137, by the locking motion 142, to attach and detach the adjustable trimmer mounting platform 101 to and from the mower deck 121.

When the adjustable trimmer mounting platform 101 is attached to the mower deck 121, as in FIGS. 1 and 6, in an alternative embodiment of the present invention, the adjustable trimmer mounting platform 101 and the trimmer line 113 are level with the mower deck 121, allowing the trimmer line to cut lawn grass level with the mower deck 121 in approximately acceptable length swaths around the perimeter of the lawn area to be mowed, kicking (sucking, propelling or pulling) grass clippings under the push lawn mower 127 and the riding lawn mower 128 to be bagged, mulched, or discharged. Keeping the trimmer line 113 level with the mower deck 121 enables the push lawn mower 127 and the riding lawn mower 128 to keep trimmed lawn area of grass level and even at all times.

The adjustable trimmer mounting platform 101, in an embodiment of the present invention, only protrudes past the plurality of wheels 126 and does not impair maneuverability or storage of the push lawn mower 127 or the riding lawn mower 128. The adjustable trimmer mounting platform 101 is easily and quickly attached or removed, in less than 1 to 2 minutes. This allows for trimmer line 113 replacement and storage.

In an embodiment of the present invention, the pair of L brackets 110 are molded (or otherwise produced in permanent attachment with) flush with the opposing bottom side 103 of the adjustable trimmer mounting platform 101, protruding past the back edge of the adjustable trimmer mounting platform 101 then upward 90 degrees to allow the pair of L brackets 110 to slide behind the inside of mower deck 121. Mounted to the top of the adjustable trimmer mounting platform 101 are the two adjustable locking pressure clamps 144 aligned with the pair of L brackets 110.

The pair of L brackets in an alternative embodiment may be made of rigid metal.

In an embodiment of the present invention, the two adjustable locking pressure clamps 144 shown in FIG. 2, have the adjustable threaded bolt 131 attached to the opposing cap end 135b to securely but freely affix the mower deck 121, in turn, against the flexible clamp ends 132 and the pair of L brackets 110. Using the clamp handle 137, the user 124, by the locking motion 142, pushes the sliding cylinder 133 through the sliding shaft 133 against the mower deck 121 and pulls the pair of L brackets 110 tight against the opposing deck inside 123 of the mower deck 121. When the clamp handle 137 is fully depressed, in the locking motion 142, the pair of clamp locking pivot arms 134 lock the two adjustable hooking pressure clamps 144 in place for a tight and secure fit.

The trimmer line 113 in an embodiment of the present invention comprises replaceable line, and provides a cutting path on the grass as the invention is operated.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention apparatus, therefore, should not be restricted, except in the following claims and their equivalents.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems, methods and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A lawn mower mounted trimmer attachment apparatus, said apparatus comprising:
   (a) an adjustable trimmer mounting platform comprising: a top side and an opposing bottom side, a mower side and an opposing trimmer side, a pair of tightening and clamping means located, respectively, on a left side and an opposing right side of the top side;
   (b) a string-type powered trimmer motor located on the top side centrally between the left side and the opposing right side and proximal to the opposing trimmer side, the string-type powered trimmer motor vertically penetrating the adjustable trimmer mounting platform;
   (c) a lawn mower located opposite and proximal to the mower side and comprising: a mower deck having a vertically descending perimeter deck skirt, a deck outside and an opposing deck inside, a lawn mower motor centrally located on the mower deck, a lawn mower power source operatively connecting to the lawn mower motor, a mower blade centrally located on the opposing deck inside beneath and propelled by the lawn mower motor, and a plurality of wheels perimeteriively and cooperatively located on and attached to the vertically descending perimeter deck skirt;
   (d) the pair of tightening and clamping means rigidly, cleanly and conformably attaching and removably securing the adjustable trimmer mounting platform to the vertically descending perimeter deck skirt of the mower deck;
   (e) the string-type powered trimmer motor comprising:
      (i) a trimmer motor power source operatively connecting to the string-type powered trimmer motor by a power line, a trimmer line having an opposing free end and an attached end extending from and operating by the string-type powered trimmer motor on the opposing bottom side; and
      (ii) at least one operating control attaching to and controlling the string-type powered trimmer motor by an operating line and being handily located on the lawn mower for a user;
   (f) a pair L brackets attaching to the opposing bottom side at the mower side, and snugly fitting and enclosing the vertically descending perimeter deck skirt against the pair of tightening and clamping means; and
   (g) whereby the lawn mower mounted trimmer attachment apparatus firmly, operatively and cooperatively attaches to the lawn mower.

2. The lawn mower mounted trimmer attachment apparatus of claim 1, wherein the lawn mower is a push lawn mower pushed by a user.

3. The lawn mower mounted trimmer attachment apparatus of claim 1, wherein the lawn mower is a riding lawn mower ridden by the user.

4. The lawn mower mounted trimmer attachment apparatus of claim 1, wherein the adjustable trimmer mounting platform is made of molded plastic.

5. The lawn mower mounted trimmer attachment apparatus of claim 1, wherein the trimmer motor power source is one of: a battery, a remote electric source or a gasoline engine.

6. The lawn mower mounted trimmer attachment apparatus of claim 1, wherein the lawn mower motor power source is one of: a battery, a remote electric source or a gasoline engine.

7. The lawn mower mounted trimmer attachment apparatus of claim 1, wherein the pair of tightening and clamping means each comprises two adjustable hooking pressure clamps.

8. The pair of tightening and clamping means of claim 7, wherein the two adjustable hooking pressure clamps each comprising:
(a) a sliding cylinder, pivotally attached to a the pair of clamp locking pivot arms at a clamp locking end toward the opposing trimmer side and extending from the clamp locking end laterally to a clamping lock position toward the mower side;
(b) the pair of clamp locking pivot arms comprising: an opposing anchor arm end and a sliding arm;
(c) the sliding cylinder being attached to an adjustable threaded bolt at the clamping lock position, the adjustable threaded bolt having a locking nut cooperatively threaded on the adjustable threaded bolt, the locking nut threadingly terminating the sliding cylinder at the clamping lock position, the adjustable threaded bolt 131 terminating at an opposing cap end proximal to the mower side;
(d) a flexible clamp end at the opposing cap end;
(e) the sliding arm to the pair of clamp locking pivot arms attaching to and pivotally engaging the sliding cylinder at the clamp locking end and concurrently and cooperatively attaching to a clamp handle at a handle end;
(f) the opposing anchor arm end to the pair of clamp locking pivot arms pivotally attaching and anchoring to the adjustable trimmer mounting platform at an anchoring arm and to the sliding am and the clamp handle at the handle end
(g) the pair of clamp locking pivot arms pivotally and cooperatively pushing and pulling the sliding cylinder laterally when the user rotates the clamp handle in a locking motion;
(h) a cylinder sleeve freely enclosing and supporting the sliding cylinder between the clamp locking end and the locking nut, and being stationarily affixed to a clamping base attaching to the top side;
(i) the sliding cylinder slidingly and freely moving laterally within the cylinder sleeve between the clamping locking end and the clamping lock position at the locking nut; and
(j) the sliding cylinder moving laterally through the cylinder sleeve and causing the flexible cylinder end cap to securely press against and adhere to vertically descending perimeter deck skirt of the deck outside while simultaneously causing the respective L bracket to securely tighten against the opposing deck inside, thereby causing the lawn mower mounted trimmer attachment apparatus to securely attach to the mower deck.

9. The lawn mower mounted trimmer attachment apparatus of claim 1, wherein the pair of L brackets are flushly and conformably molded with the opposing bottom side of the adjustable trimmer mounting platform, protruding past the mower side of the adjustable trimmer mounting platform then upward allowing the pair of L brackets to slide against the opposing deck inside opposite the mower side.

10. The lawn mower mounted trimmer attachment apparatus of claim 1, wherein the pair of L brackets are made of rigid metal.

11. The lawn mower mounted trimmer attachment apparatus of claim 1, wherein the trimmer line is replaceable.

12. A lawn mower mounted trimmer method, said method comprising:
(a) having an adjustable trimmer mounting platform comprising: a top side and an opposing bottom side, a mower side and an opposing trimmer side, a pair of tightening and clamping means located, respectively, on a left side and an opposing right side of the top side;
(b) locating a string-type powered trimmer motor on the top side centrally between the left side and the opposing right side and proximal to the opposing trimmer side, the string-type powered trimmer motor vertically penetrating the adjustable trimmer mounting platform;
(c) having a lawn mower located opposite and proximal to the mower side and comprising: a mower deck having a vertically descending perimeter deck skirt, a deck outside and an opposing deck inside, a lawn mower motor centrally located on the mower deck, a lawn mower power source operatively connecting to the lawn mower motor by a power line, a mower blade centrally located on the opposing deck inside beneath and propelled by the lawn mower motor, and a plurality of wheels perimeterively and cooperatively located on and attached to the vertically descending perimeter deck skirt;
(d) the pair of tightening and clamping means rigidly and conformably attaching and removably securing the adjustable trimmer mounting platform to the vertically descending perimeter deck skirt of the mower deck;
(e) having the string-type powered trimmer motor comprising:
(i) a trimmer motor power source operatively connecting to the string-type powered trimmer motor, a trimmer line having an opposing free end and an attached end extending from and operating by the string-type powered trimmer motor on the opposing bottom side; and
(ii) at least one operating control attaching to and controlling the string-type powered trimmer motor by an operating line and being handily located on the lawn mower for a user;
(f) attaching a pair L brackets to the opposing bottom side at the mower side, and snugly fitting and enclosing the vertically descending perimeter deck skirt against the pair of tightening and clamping means; and
(g) thereby operatively, firmly and cooperatively attaching the lawn mower mounted trimmer attachment apparatus to the lawn mower.

13. The lawn mower mounted trimmer attachment method of claim 12, wherein the lawn mower is a push lawn mower pushed by a user.

14. The lawn mower mounted trimmer attachment method of claim 12, wherein the lawn mower is a riding lawn mower ridden by the user.

15. The lawn mower mounted trimmer attachment method of claim 12, wherein the adjustable trimmer mounting platform is made of molded plastic.

16. The lawn mower mounted trimmer attachment method of claim 12, wherein the trimmer motor power source is one of: a battery, a remote electric source or a gasoline engine.

17. The lawn mower mounted trimmer attachment method of claim 12, wherein the lawn mower motor power source is one of a battery, a remote electric source or a gasoline engine.

18. The lawn mower mounted trimmer attachment method of claim 12, wherein the pair of tightening and clamping means each comprising: a quick release/locking pressure clamp.

19. The lawn mower mounted trimmer attachment method of claim 12, wherein the pair of L brackets comprise:
   (a) being flushly and conformably molded within the opposing bottom side of the adjustable trimmer mounting platform, protruding past the mower side of the adjustable trimmer mounting platform then upward, allowing the pair of L brackets to slide against the opposing deck inside opposite the mower side; and
   (b) being made of rigid metal.

20. The lawn mower mounted trimmer attachment method of claim 12, further comprising allowing attachment of the adjustable trimmer mounting platform to the mower deck without modification to the adjustable trimmer mounting platform or the lawn mower.

\* \* \* \* \*